United States Patent Office 2,723,977
Patented Nov. 15, 1955

2,723,977

5,6-DISUBSTITUTED 2-AMINO-4-PYRIMIDOLS

Kurt J. Rorig, Evanston, Ill., assignor to G. D. Searle & Co., Chicago, Ill., a corporation of Illinois No Drawing. Application July 29, 1953,
Serial No. 371,157

6 Claims. (Cl. 260—256.4)

My invention is concerned with a new group of 5,6-disubstituted 2-amino-4-pyrimidols and, specifically, with the compounds of the structural formula

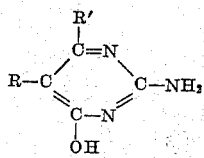

wherein one of the radicals R and R' is a lower alkyl radical and the other is an aryl radical.

In the foregoing structural formula, one of the radicals R and R' represents a lower alkyl radical such as methyl, ethyl, straight and branched chain propyl, butyl, amyl and hexyl, while the other represents an aryl radical. Among the aryl radicals which I prefer for the purposes of my invention are such monocyclic aryl hydrocarbon radicals as phenyl and the lower alkylated phenyl radicals such as tolyl, xylyl, cumyl, diethylphenyl, and the like.

The compounds which constitute my invention are valuable therapeutic agents for the treatment of cardiovascular and renal disease. It is interesting to note that it is essential that both the 5- and 6-positions in the pyrimidine ring are substituted in the manner indicated hereinabove. Thus, while the 2-amino-5-methyl-6-phenyl-4-pyrimidol is a highly potent diuretic agent, replacement of the 5-methyl group by a hydrogen atom causes the compound to lose its utility as a diuretic agent. I have also found that 2-amino-5,6-di(lower alkyl)-4-pyrimidols, in which the aryl group is replaced by a lower alkyl group, lack the therapeutic activity of the claimed compositions.

The compounds of my invention are also valuable as intermediates in the synthesis of other cardiovascular drugs. Thus treatment with phosphorus oxychloride converts the pyrimidols to 4-chloropyrimidines of the structural formula

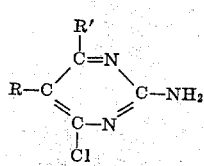

Treatment of these chloro compounds with an alkali metal alcoholate yields the alkoxide of the formula

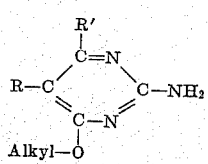

Heating of the above chloro compound with ammonia in a sealed tube at about 180° yields the 2,4-diamines of the structural formula

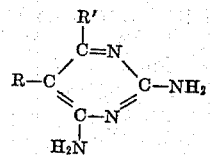

Replacement of ammonia in this reaction by lower alkylamines and lower dialkylamines yields compounds of the type

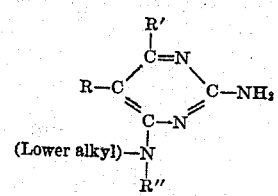

wherein R" is hydrogen or a lower alkyl radical.

The 2-amino-4-pyrimidols of my invention form salts with a variety of inorganic and strong organic acids, including sulfuric, phosphoric, hydrochloric, hydrobromic, sulfamic, citric, ascorbic and related acids.

In the preparation of the compounds of my invention I prefer to heat, under anhydrous conditions, a simple acid addition salt of guanidine with a lower alkyl ester of an α-aroylalkanoic or α-alkanoyl-α-arylacetic acid in a solvent such as a lower alkanol according to the following reaction scheme:

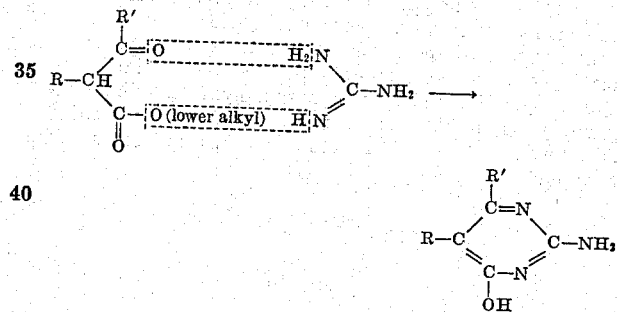

R and R' being defined as hereinabove. Where more vigorous reaction conditions are required such alkaline condensing agents as sodium methoxide are advantageously used.

In the preparation of the lower alkyl esters of the α-aroylalkanoic acids serving as starting materials, I prefer Blaise's adaptation of the Reformatsky reaction, which proceeds according to the following reaction scheme:

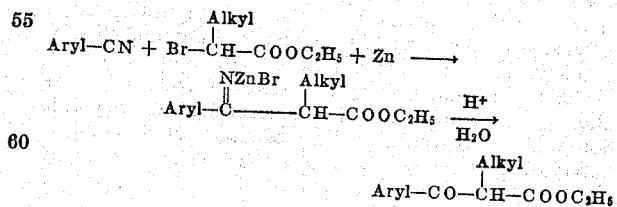

The following examples illustrate in further detail the compounds which constitute my invention and methods for their preparation. However, my invention is not to be construed as limited thereby in spirit or in scope. It will be noted that the products are high melting solids and I have found that the melting points are difficult to reproduce as they vary considerably with reaction conditions. In these examples temperatures are indicated in degrees centigrade (° C.) and quantities of materials in parts by weight.

Example 1

In a reaction vessel equipped with a reflux condenser and a drying tube, a solution of 170 parts of guanidine carbonate, 325 parts of the ethyl ester of α-benzoylpropionic acid and 1000 parts of ethanol is heated at reflux temperature for 12 hours. The reaction mixture is then stored at 0° C. for 24 hours. A precipitate forms which is collected on a filter and the mother liquor is evaporated under vacuum to about one-third of its original volume and then diluted with 1500 parts of hot water. Upon cooling, an additional yield of the 2-amino-5-methyl-6-phenyl-4-pyrimidol is obtained. The crystals consist of white flakes of high lustre and melt at about 287–288° C. with decomposition. The compound has the structural formula

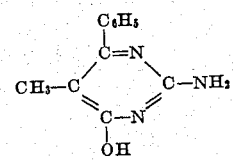

Example 2

A solution of 66 parts of guanidine hydrochloride in 500 parts of absolute ethanol is poured into a solution of 44 parts of sodium methoxide in 500 parts of absolute ethanol. The precipitated sodium chloride is filtered off and 117 parts of the ethyl ester of α(2,5-xyloyl)-propionic acid are added. The reaction mixture is heated for 10 minutes on the steam bath and then permitted to stand at 0° C. for 12 hours. A slightly yellowish precipitate is collected on the filter. Additional yield is obtained by concentration of the alcoholic filtrate to one-half of its original volume and dilution with 1000 parts of hot water and refrigeration. The 2-amino-5-methyl-6-(2,5-dimethylphenyl)-4-pyrimidol forms clear, flaky crystals melting at above 280° C. The compound has the structural formula

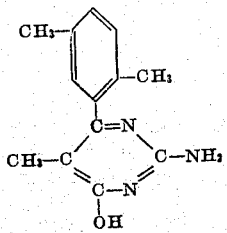

Example 3

Under anhydrous conditions, a suspension of 34 parts of guanidine carbonate and 78 parts of the ethyl ester of α-benzoylisocaproic acid in 1200 parts of absolute ethanol is heated at reflux temperature for 10 hours and then chilled. The initial crop of crystals is collected on a filter and the mother liquor is concentrated, diluted with hot water and cooled. The resulting 2-amino-5-isobutyryl-6-phenyl-4-pyrimidol forms lemon-colored, high-melting crystals. The compound has the structural formula

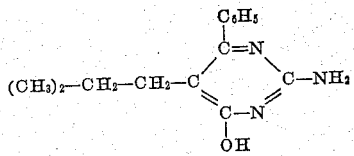

Example 4

To a warm suspension of 23 parts of sodium methoxide and 38 parts of guanidine hydrochloride in 175 parts of absolute ethanol are added 66 parts of the ethyl ester of α-phenylacetoacetic acid. The mixture is refluxed for 16 hours. After chilling in the refrigerator for 24 hours, the combined solids are collected on a filter and the sodium chloride and residual guanidine are washed out with cold water. The remaining 2-amino-5-phenyl-6-methyl-4-pyrimidol is suspended in 1000 parts of almost boiling absolute ethanol. A sufficient amount of 18% ethanolic hydrogen chloride is added to cause solution of the pyrimidine. On cooling, the hydrochloride of 2-amino-5-phenyl-6-methyl-4-pyrimidol is obtained in lustrous, white crystals. The compound has the structural formula

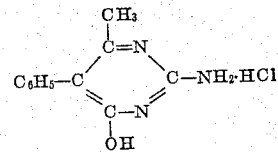

I claim:
1. A compound of the structural formula

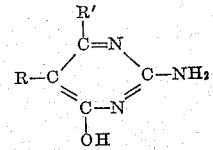

wherein one of the radicals R and R' is a lower alkyl radical and the other is a monocyclic aryl hydrocarbon radical.

2. A 2-amino-5-(lower alkyl)-6-aryl-4-pyrimidol of the structural formula

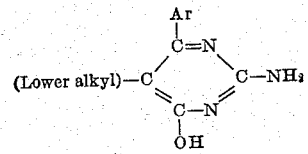

wherein Ar is a monocyclic aryl hydrocarbon radical.
3. A 2-amino-5-(lower alkyl)-6-phenyl-4-pyrimidol.
4. 2-amino-5-methyl-6-phenyl-4-pyrimidol.
5. A 2-amino-5-phenyl-6-(lower alkyl)-4-pyrimidol.
6. 2-amino-5-phenyl-6-methyl-4-pyrimidol.

References Cited in the file of this patent

UNITED STATES PATENTS

| | | |
|---|---|---|
| 2,624,731 | Hitchings et al. | Jan. 6, 1953 |
| 2,691,655 | Hitchings et al. | Oct. 12, 1954 |